April 21, 1936. P. VAN CLEEF 2,038,325
MASKING TAPE
Filed April 28, 1934
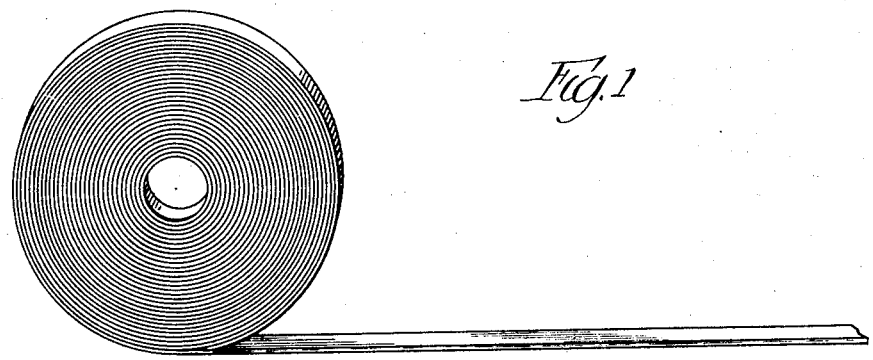
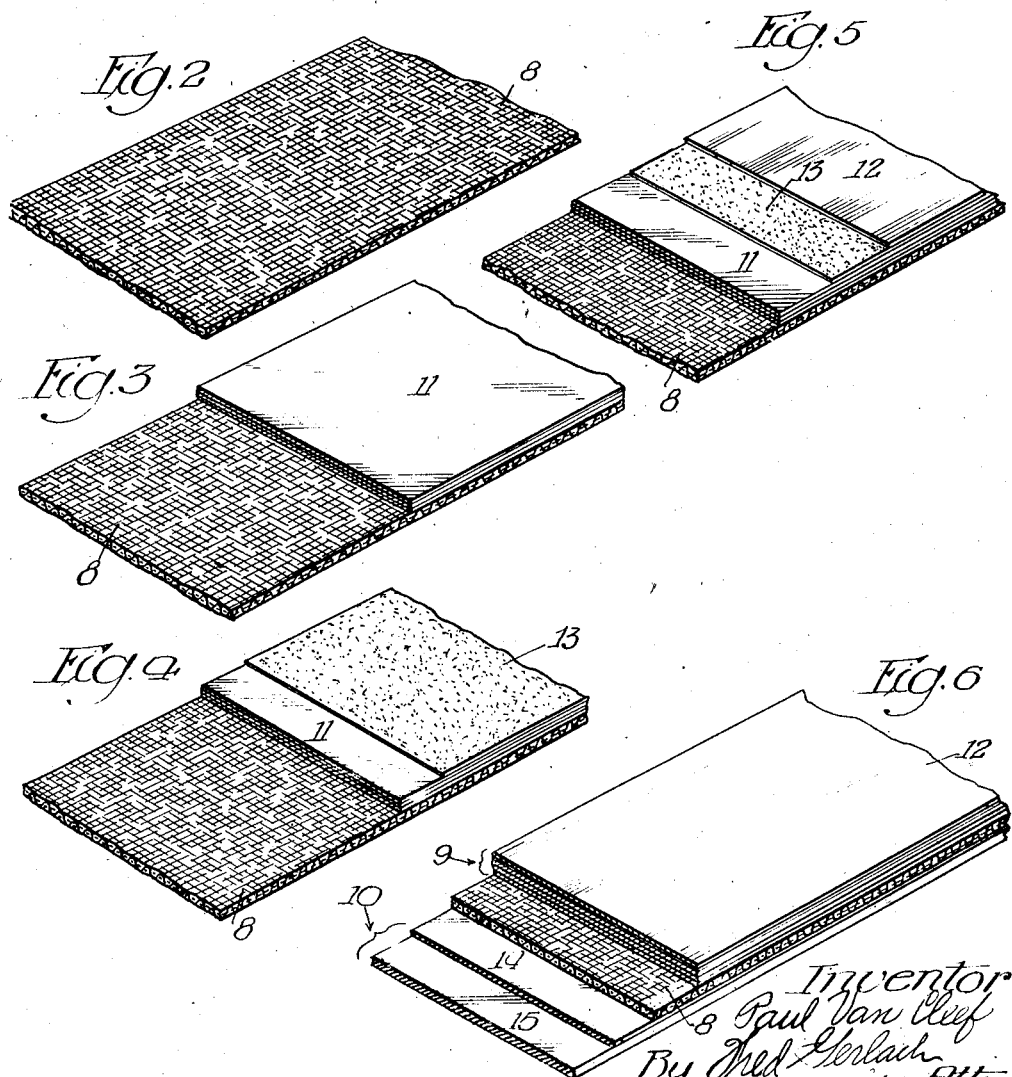

Patented Apr. 21, 1936

2,038,325

UNITED STATES PATENT OFFICE 2,038,325

MASKING TAPE

Paul Van Cleef, Chicago, Ill., assignor to Van Cleef Bros., Chicago, Ill., a partnership consisting of Noah Van Cleef, Felix Van Cleef, Maxime Van Cleef, and Paul Van Cleef Application April 28, 1934, Serial No. 722,995

14 Claims. (Cl. 91—68)

The present invention relates generally to masking tape. More particularly the invention relates to that type of masking tape which is merchandised or supplied in rolled form and comprises a long narrow strip of woven fabric having a pressure sensitive, rubber base adhesive on the inner face thereof and a protective coating on its outer face whereby it is rendered impervious to paint, lacquer, and other finishing materials.

One object of the invention is to provide a masking tape of this type which is an improvement upon, and better serves its purpose than, previously designed tape of the same general character by reason of the fact that the protective coating on the outer face of the woven fabric strip is in the form of a layer of rubber which is cured or vulcanized after application to the strip so that it fills the interstices of the fabric, impregnates itself into the threads, forms straight, non-ravelling edges for the strip and renders the strip resistant to oils, organic solvents and water.

Another object of the invention is to provide a masking tape of the last mentioned character in which the cured or vulcanized rubber layer on the outer face of the strip embodies a comparatively thin coating of material which is substantially non-adherent to pressure sensitive rubber material and serves to preclude adhesion of the pressure sensitive, rubber base adhesive on the inner face of the strip and the cured or vulcanized rubber layer on the outer face of the strip when the strip is rolled on itself.

A further object of the invention is to provide a masking tape which may be manufactured at a low cost and is so formed that it may be re-used from time to time without losing its original properties and characteristics.

A still further object of the invention is the provision of a method or process of manufacturing masking tape of the type and character here under consideration which contemplates the formation of the protective coating on the outer face of the woven fabric strip before applying the pressure sensitive, rubber base adhesive to the inner face and by spreading three or four thin coats of rubber on the outer face of the strip then dusting the top coat of rubber with finely powdered clay or like material, then applying a thin coating of resinous varnish or like material on top of the dusting of powdered clay and finally subjecting the strip to a vulcanizing temperature in order to cure or vulcanize the rubber and thus effect impregnation of the rubber into the threads of the strip.

Other objects of the invention and the various advantages and characteristics of the present masking tape will be apparent from a consideration of the following detailed description.

The invention consists in the several novel features which are hereinafter set forth and are more particularly defined by claims at the conclusion hereof.

In the drawing which accompanies and forms a part of the present specification and disclosure and in which like numerals of reference denote corresponding parts throughout the several views:

Figure 1 is a prespective of a roll of masking tape embodying the invention;

Figure 2 is a perspective showing the fabric strip before application of the protective coating and the pressure sensitive adhesive;

Figure 3 is a perspective showing the strip after application of several thin coats of rubber to its outer face;

Figure 4 is a perspective showing the strip after dusting of the top coat of rubber with powdered clay;

Figure 5 is a perspective showing the strip after coating of the dusted rubber with resinous varnish or like material; and Figure 6 is a perspective showing the tape in its finished state and illustrating the manner in which the pressure sensitive, rubber base adhesive is applied to the inner face of the strip.

The masking tape which forms the subject matter of the invention is designed primarily for use in connection with the application of paint, lacquer or other finishing material to a surface and serves as a shield or mask whereby portions of the surface are protected from receiving a coating or layer of the finishing material. It is adapted to be merchandised in rolled form and consists of a long, narrow strip 8 of woven fabric, a protective coating 9 on the outer face of the strip and a pressure sensitive adhesive 10 on the inner face of the strip. The strip 8 forms the base of the tape and is cut from a thin sheet of material in the direction of one set of threads, that is so that one set of threads extends lengthwise of the strip as illustrated in Figure 2 of the drawing.

The protective coating 9 is applied to the strip before the pressure sensitive adhesive 10 and consists of a layer 11 of rubber and a coating 12 of varnish or glue or any like material which is substantially non-adherent to pressure sensitive rubber material and serves to prevent adhesion of the pressure sensitive adhesive 10 and the protecting coating 9 when the strip is rolled on itself. The rubber layer 11 is formed by spreading on the outer face of the strip 8 three or four thin coats of rubber having vulcanizing material or materials mixed therewith. These coats are preferably applied by means of a spreading machine. After spreading of the rubber coats on the outer face of the woven fabric strip 8, the top coat of rubber is provided with a dusting 13 of powdered clay or like material. Thereafter the coating 12 is applied and the strip together with the rubber layer 11 and the coating 12 is subjected to vulcanizing temperature so as to cure or vulcanize the layer 11. As the result of curing or vulcanization of the layer 11 the rubber fills the interstices of the fabric, impregnates itself into the threads, forms straight non-ravelling side edges for the strip and renders the strip resistant to oils, organic solvents and water. The coating 12 is formed of resinous varnish such as shellac, animal glue, such as hide glue, or vegetable glue such as a casein or starch solution. The dusting 13 of powdered clay makes the coating 12 adhere better to the rubber layer 11 and produces a dull finish. By reason of the fact that the rubber layer 11 renders the tape resistant to oils, organic solvents and waters there is no likelihood of the pressure sensitive adhesive 10 coming loose from the woven fabric strip 8 when the tape is subjected to paint, varnish or other finishing materials.

The pressure sensitive adhesive 10 is applied to the inner face of the strip 8 after curing or vulcanization of the rubber layer 11 and consists of a thin anchor coat 14 and a heavy coat 15 of adhesive rubber. The anchor coat 14 is formed of pure rubber and is spread by a machine over the inner face of the strip 8. The coat 15 is formed of plasticized rubber, that is, rubber containing resin or other softening ingredients, and is applied to the anchor coat 14 by calendering it onto the latter. The pressure sensitive adhesive 8 permits the tape to be stuck in place and is permanently adhesive so that the tape may be reused whenever desired.

The herein described masking tape may be manufactured at a low cost and is efficient in use due to the fact that the cured or vulcanized rubber layer 11 forms non-ravelling side edges for the strip 8. When the strip is rolled on itself as shown in Figure 1, the varnish or glue coating 12 prevents, as previously pointed out, adhesion of the pressure sensitive adhesive 10 and the protective coating 9.

Whereas the tape has been described as a masking tape it is to be understood that it may be used for other purposes. It is also to be understood that the invention is not to be restricted to the details set forth, since these may be modified within the scope of the appended claims, without departing from the spirit and scope of the invention.

This application for Letters Patent is a continuation in part of an application for Letters Patent for improvements in Adhesive tape or sheet, filed by me July 25, 1931, Serial No. 553,070.

Having thus described the invention, what I claim as new and desire to secure by Letters Patent, is:

1. As a new article of manufacture, a tape comprising a comparatively narrow woven fabric strip having on the inner face thereof a thin anchor coat of pure rubber and a heavy coating of pressure sensitive rubber base adhesive calendered onto the anchor coat and having applied to its outer face a layer of rubber that is cured or vulcanized after application to the strip so that it fills the interstices of the fabric, impregnates itself into the threads, forms straight, non-raveling edges for the strip and renders the strip resistant to oils, organic solvents and water.

2. As a new article of manufacture, a tape comprising a comparatively narrow, woven fabric strip embodying on the inner face thereof a pressure sensitive adhesive of rubber base and having applied to its outer face a layer of rubber that is cured or vulcanized after application to the strip so that it fills the interstices of the fabric, impregnates itself into the threads, forms straight, non-raveling edges for the strip and renders the strip resistant to oils, organic solvents and water, and a comparatively thin coating of material substantially non-adherent to pressure sensitive rubber applied to and covering the cured rubber layer and serving to preclude adhesion of the pressure sensitive adhesive on said inner face of the strip and the cured rubber layer on the outer face of the strip when the strip is rolled on itself.

3. As a new article of manufacture, a tape comprising a comparatively narrow, woven fabric strip embodying on the inner face thereof a pressure sensitive adhesive of rubber base and having applied to its outer face a layer of rubber that is cured or vulcanized after application to the strip so that it fills the interstices of the fabric, impregnates itself into the threads, forms straight non-raveling edges for the strip and renders the strip resistant to oils, organic solvents and water, and a comparatively thin resinous varnish coating on the cured rubber layer for lessening adhesion of the pressure sensitive adhesive on said inner face of the strip and the cured rubber layer on the outer face of the strip when the strip is rolled on itself.

4. As a new article of manufacture, a tape comprising a comparatively narrow strip cut from a thin sheet of woven fabric in the direction of one set of threads and embodying on the inner face thereof a pressure sensitive adhesive of rubber base and having applied to its outer face a layer of rubber that is cured or vulcanized after application to the strip so that it fills the interstices of the fabric, impregnates itself into the threads, forms straight non-raveling edges for the strip and renders the strip resistant to oils, organic solvents and water, and a comparatively thin shellac coating on the cured rubber layer for lessening adhesion of the pressure sensitive adhesive on said inner face of the strip and the cured rubber layer on the outer face of the strip when the strip is rolled on itself.

5. That improvement in the manufacture of tape which consists in applying a layer of rubber to one face of a woven fabric strip then curing or vulcanizing the layer so as to unite it to the strip and render the latter impervious to oils, organic solvents, and water, and finally applying a pressure sensitive rubber base adhesive to the other face of the strip.

6. That improvement in the manufacture of tape which consists in spreading a plurality of thin coats of rubber over one face of a woven fabric strip in order to form a composite layer, then curing or vulcanizing the layer so as to unite it to the strip and render the latter impervious to oils, organic solvents, and water, and finally applying a pressure sensitive rubber base adhesive to the other face of the strip.

7. That improvement in the manufacture of tape which consists in applying a layer of rubber to one face of a woven fabric strip and coating the layer with a comparatively thin coating of material substantially non-adherent to pressure sensitive rubber, then curing or vulcanizing the layer so as to unite it to the strip and render the latter impervious to oils, organic solvents, and water, and finally applying a pressure sensitive rubber base adhesive to the other face of the strip.

8. That improvement in the manufacture of tape which consists in applying a layer of rubber to one face of a woven fabric strip and coating the layer with a resinous varnish, then subjecting the strip to a vulcanizing temperature in order to cure or vulcanize the layer and harden the varnish coating, and finally applying a pressure sensitive adhesive to the outer face of the strip.

9. That improvement in the manufacture of tape which consists in applying a layer of rubber to one face of a woven fabric strip and dusting the layer with powdered material having the properties and characteristics of powdered clay, then curing or vulcanizing the layer so as to unite it to the strip and render the latter impervious to oils, organic solvents, and water, and finally applying a pressure sensitive rubber base adhesive to the other face of the strip.

10. That improvement in the manufacture of tape which consists in applying a layer of rubber to one face of a woven fabric strip, then dusting the layer with powdered clay and covering the layer with a thin coating of resinous varnish, then subjecting the strip to a vulcanizing temperature in order to cure or vulcanize the layer and harden the coating, and finally applying a pressure sensitive rubber base adhesive to the other face of the strip.

11. That improvement in the manufacture of tape which consists in applying a layer of rubber to one face of a woven fabric strip, then dusting the layer with powdered clay and applying a coating of resinous varnish to the layer, then subjecting the strip to a vulcanizing temperature in order to cure or vulcanize the layer and harden the resinous varnish coating, and finally applying a pressure sensitive adhesive to the outer face of the strip.

12. That improvement in the manufacture of tape which consists in spreading a plurality of thin coats of rubber over one face of a woven fabric strip in order to form a composite layer, then dusting the outer-most rubber coat with a powdered material having the properties and characteristics of powdered clay and varnishing the dusted coat, then subjecting the strip to a vulcanizing temperature in order to cure or vulcanize the layer and harden the varnish, and finally applying a pressure sensitive adhesive to the outer face of the strip.

13. That improvement in the manufacture of tape which consists in applying to one face of a flexible strip a layer of rubber having vulcanizing material therewith, then curing or vulcanizing the layer so as to unite it to the strip and render the latter impervious to oils, organic solvents and water, and finally applying a pressure sensitive rubber base adhesive to the other face of the strip.

14. As a new article of manufacture, a tape comprising a comparatively narrow woven fabric strip having applied to the outer face thereof a thin layer of rubber that is cured or vulcanized after application of the strip so that it fills the interstices of the fabric and impregnates itself into the threads, forms straight, non-raveling edges for the strip and renders the strip resistant to oils, organic solvents and water, and having a thin layer of pressure sensitive rubber adhesive applied to its inner face after vulcanization of the first mentioned layer, and a comparatively thin coating of material substantially non-adherent to the pressure sensitive adhesive applied to and covering the cured rubber layer and serving to preclude adhesion of the layer on the inner face of the strip to the layer on the outer face of said strip when the strip is rolled on itself.

PAUL VAN CLEEF.